Oct. 14, 1952 P. H. MILLER 2,613,714
SLICING DEVICE FOR CULINARY PURPOSES
Filed July 20, 1949
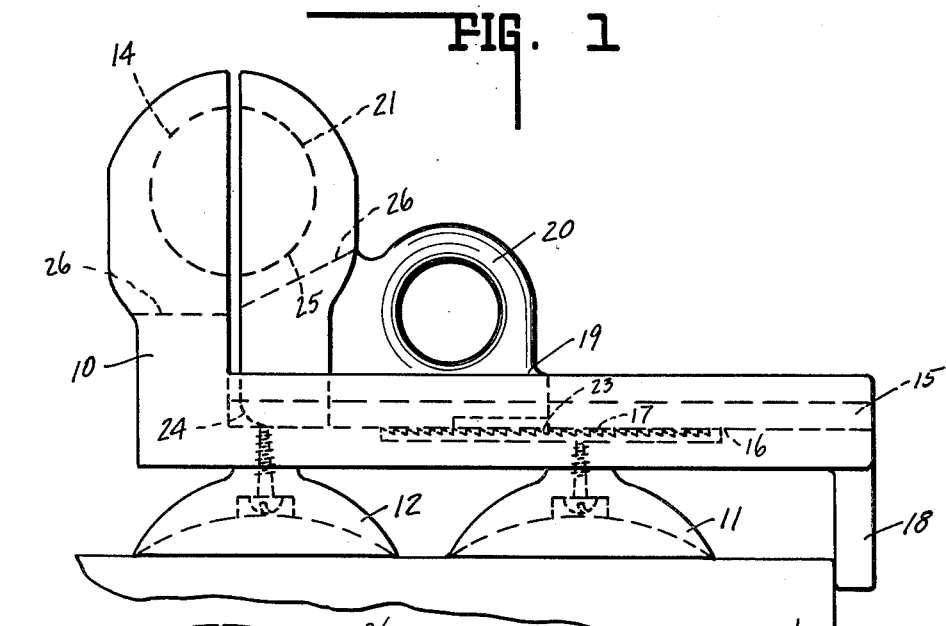
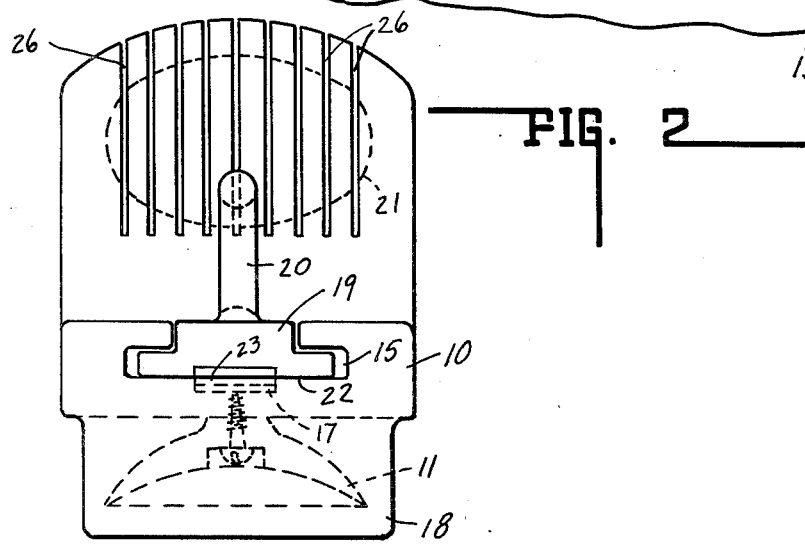
INVENTOR.
PAUL H. MILLER.
BY
Lockwood, Goldsmith & Galt.
ATTORNEYS.

Patented Oct. 14, 1952

2,613,714

UNITED STATES PATENT OFFICE 2,613,714

SLICING DEVICE FOR CULINARY PURPOSES

Paul H. Miller, Indianapolis, Ind.

Application July 20, 1949, Serial No. 105,798

2 Claims. (Cl. 146—150)

This invention relates to a slicing device for culinary purposes, and more particularly to a device for use in slicing oranges, lemons, hard-boiled eggs and the like.

It is frequently necessary or desirable that fruits, vegetables, and other edibles be sliced into segments for use. For example, when iced tea is being served, it is customary to provide a segment of lemon therewith. While it is possible to do the slicing with an ordinary kitchen knife, it is common knowledge that cuts may be, and frequently are, sustained in the process.

It is the primary object of this invention to provide a device which will render the slicing or cutting process easy and safe, and which will result in uniform segments being sliced.

It is a further object of this invention to provide an adjustable device which will permit "loading" of the lemon, orange, or the like therewithin in an expeditious and secure manner.

It is a still further object of this invention to provide a device of such construction that the weight of the article being sliced will automatically serve to lock the article in its "loaded" ready-to-be-sliced position.

It is a still further object of this invention to provide an adjustable device of such construction that the parts within which the food or vegetable is contained may be relatively moved from a containing to a releasing position with a minimum of care and effort.

The primary feature of the present invention resides in the provision of an adjustable retaining slide so designed and constructed that it can be moved to the desired slicing position whereupon the weight of the article to be sliced will automatically lock it in that position.

An additional feature of the present invention resides in the provision of means to permit the adjustable slide to be unlocked by a simple rocking action thereof, whereupon it may be moved to a releasing position.

The full nature of the invention will be understood from the accompanying drawings and the following description and claims:

Fig. 1 is a side elevation view of the invention showing the adjustable slide in the fruit or vegetable containing position.

Fig. 2 is an end view thereof.

In the drawings 10 shows a substantially L-shaped base member which is suitably secured as by the suction cups 11 and 12 to a kitchen table 13 or other support structure. The arm portion of the L-shaped member has formed therewithin a rearwardly directed cavity 14 within which is seatable a portion of the fruit, vegetable, or the like to be sliced. The base of the substantially L-shaped member has formed therewithin a longitudinally disposed, upwardly exposed slot 15 which is substantially an inverted T in cross section. Formed in the bottom 16 of said slot intermediate the extremities thereof are the upwardly extending, inwardly directed ratchet teeth 17. At the free end of the base of said member is a depending stop element 18 which is adapted to abut the edge of a table or the like upon which the invention may be placed, thereby serving to stabilize it in cooperation with the suction cups 11 and 12.

Slidable longitudinally within the slot 15 is the adjustable retaining slide 19 having finger grip means 20 integral therewith. The retaining slide is also substantially L-shaped, and the arm portion thereof has formed therein a forwardly directed cavity 21 which is complementary to and cooperates with the cavity 14. The base of the slide is in the form of an inverted T-shaped tongue having portions slightly less in depth and width than the area of the slot 15 within which it is slidable. Depending a slight distance from the bottom surface 22 of the tongue are the rearwardly directed ratchet teeth 23 which are complementary to and mate with ratchet teeth 17. These ratchet teeth are so designed and formed that they permit the retaining slide to be moved longitudinally inwardly towards the cavity 14, but serve as stop elements to prevent a rearward movement thereof until the respective ratchet teeth are moved out of engagement one series with another.

In order to make it possible for the retaining slide to be moved rearwardly after the fruit or vegetable has been sliced and in order to release the latter, the vertex of the substantially L-shaped retaining slide is beveled or rounded as at 24. In addition, the depth of the tongue is sufficiently less than the depth of the slot within which it is slidable to permit the entire retaining slide to be rocked upwardly and downwardly angularly within the slot about the rounded end 24 which will serve as a pivot.

When it is desired to slice a vegetable, fruit, or other edible such as a hard boiled egg or the like, the article is held within the cavity 14 which will accommodate approximately one-half thereof, whereupon the adjustable slide is moved inwardly until the article is accommodated and enveloped by both cavities. At such time the article will bear upon the lower portion of the wall 25 defining the cavity 21, thereby forcing the entire retaining slide a slight distance downwardly. The complementary ratchet teeth formed within the slot and on the tongue, respectively, will thereupon be held in mesh thus serving to lock the retaining slide in position for the slicing operation. In order that the slicing operation may be accomplished, there are formed in the arm portions of said members a plurality of spaced vertically disposed slots 26 which open through the upper edges of the free ends of the arm portions. The slots formed in one portion are in alignment with those formed in the other. A knife may thereupon be passed downwardly within the desired opposed slots in order to slice the article contained within the cavities into a plurality of slices. In the event it is desired to slice the article into halves it is obviously possible to pass the knife downwardly in a transverse rather than longitudinal direction, the path of the knife being guided by the inner opposed faces of the respective arm portions. In other words, the invention makes possible not only a longitudinally but a transversely guided slicing action.

When the slicing operation has been completed, it is possible to lift upwardly upon the retainer slide through the medium of the handle or finger grip element 20, whereupon the entire slide will pivot about its rounded end portion 24 and effect the disengagement of the complementary ratchet teeth. It is then possible to move the slide rearwardly the desired distance so that the sliced article may be removed.

While the invention has been illustrated and described in its preferred embodiment in the drawings and foregoing description, the same is to be considered as illustrative and not restrictive in character.

The invention claimed is:

1. A slicing device for use in slicing fruits, vegetables and the like comprising two cooperating members, each of said members having a base portion and an upright wall formed at the forward end thereof, one of said members having a longitudinally disposed inverted T slot formed in the base portion thereof, the other of said members having a longitudinally disposed inverted T tongue formed in the base portion thereof and being loosely slidable within said slot, the depth of said tongue being sufficiently less than the depth of said slot to permit relative angular movement therewithin, cooperating interlocking ratchet teeth disposed in the bottom of said slot and the bottom of said tongue respectively, so constructed and arranged as normally to resist rearward movement of said tongue relative to said slot, the upright walls of said members having opposed cooperating recesses formed in the confronting faces thereof substantially above said respective base portions, said recesses each being defined by rear and side walls for enveloping said fruit or vegetable, said walls each having a plurality of spaced longitudinally aligned slots extending downwardly from the tops thereof, to a point slightly below said recesses, and finger grip means carried by said second mentioned base portion medially of its sides and on the top of said base portion to permit a forward rocking movement of said second mentioned member relative to said first mentioned member whereby said interlocking elements are disengaged and said base portions may be moved longitudinally relative to each other.

2. A slicing device for use in slicing fruits, vegetables and the like comprising a pair of cooperating members, one of said members having an upwardly exposed longitudinally extending slot formed in the base portion thereof, the other of said members having a complementary tongue depending from the base portion thereof, said tongue being formed to dimensions sufficiently less than the dimensions of said slot to permit loosely interfitting association therebetween, forwardly directed ratchet teeth projecting upwardly from the bottom of said slot intermediate the ends thereof, rearwardly disposed ratchet teeth depending downwardly from said tongue intermediate the ends thereof, said respective teeth being normally engageable to resist rearward movement of said second mentioned member relative to said first mentioned member, upright walls formed at the forward ends of each of said members, said walls having opposed cooperating concavities formed in the confronting faces thereof substantially above said respective base portions, said concavities being defined by rear and side walls for enveloping said fruit or vegetable, a plurality of spaced longitudinally aligned slots formed in said respective walls and extending downwardly from the top thereof to a point slightly below said concavities, and finger grip means carried by said second mentioned base portion medially of its sides and on the top thereof whereby forward rocking movement of said second mentioned member relative to said first mentioned member is permitted to disengage said interlocking elements.

PAUL H. MILLER.

REFERENCES CITED

The following references are of record in the file of this patent:

UNITED STATES PATENTS

| Number | Name | Date |
| --- | --- | --- |
| 280,796 | Chapman | July 10, 1883 |
| 920,345 | Kolodziej | May 4, 1909 |
| 1,254,119 | Chamberlain | Jan. 22, 1918 |
| 1,626,922 | Downs | May 3, 1927 |
| 1,703,154 | Lanzkron | Feb. 26, 1929 |
| 1,754,235 | Wilmking | June 17, 1930 |
| 2,133,529 | Benson | Oct. 18, 1938 |
| 2,433,957 | Millholland | Jan. 6, 1948 |